(No Model.)

2 Sheets—Sheet 1.

J. E. EMERSON.
BAND SAW MILL.

No. 356,930. Patented Feb. 1, 1887.

Witnesses
F. H. Schott
H. A. Daniels

Inventor
James E. Emerson
By his Attorney Newton Cranford (No Model.)

J. E. EMERSON.
BAND SAW MILL.

No. 356,930. Patented Feb. 1, 1887.

Witnesses
F. H. Schott
H. A. Daniels

Inventor
James E. Emerson
By his Attorney Newton Cranford

UNITED STATES PATENT OFFICE.

JAMES E. EMERSON, OF BEAVER FALLS, PENNSYLVANIA.

BAND-SAW MILL.

SPECIFICATION forming part of Letters Patent No. 356,930, dated February 1, 1887.

Application filed March 9, 1886. Serial No. 194,632. (No model.)

*To all whom it may concern:*

Be it known that I, JAMES E. EMERSON, a citizen of the United States, residing at Beaver Falls, in the county of Beaver and State of Pennsylvania, have invented certain new and useful Improvements in Band-Saw Mills, of which the following is a specification, reference being had therein to the accompanying drawings.

The object of this invention is to so construct the frame-work of a band-saw mill that it can be easily and cheaply attached to a portable or other circular-saw mill and have the band saw do the work of a circular saw without in any way changing or disarranging the operating parts of the circular-saw mill, except to remove the circular saw from its arbor or shaft; also, to so change the position of the working of the band-saw with relation to its cut in the log or timber that less power will be required to drive the saw; and the invention consists in the special construction and arrangement of parts so as to successfully accomplish the object aimed at.

Figure 1:
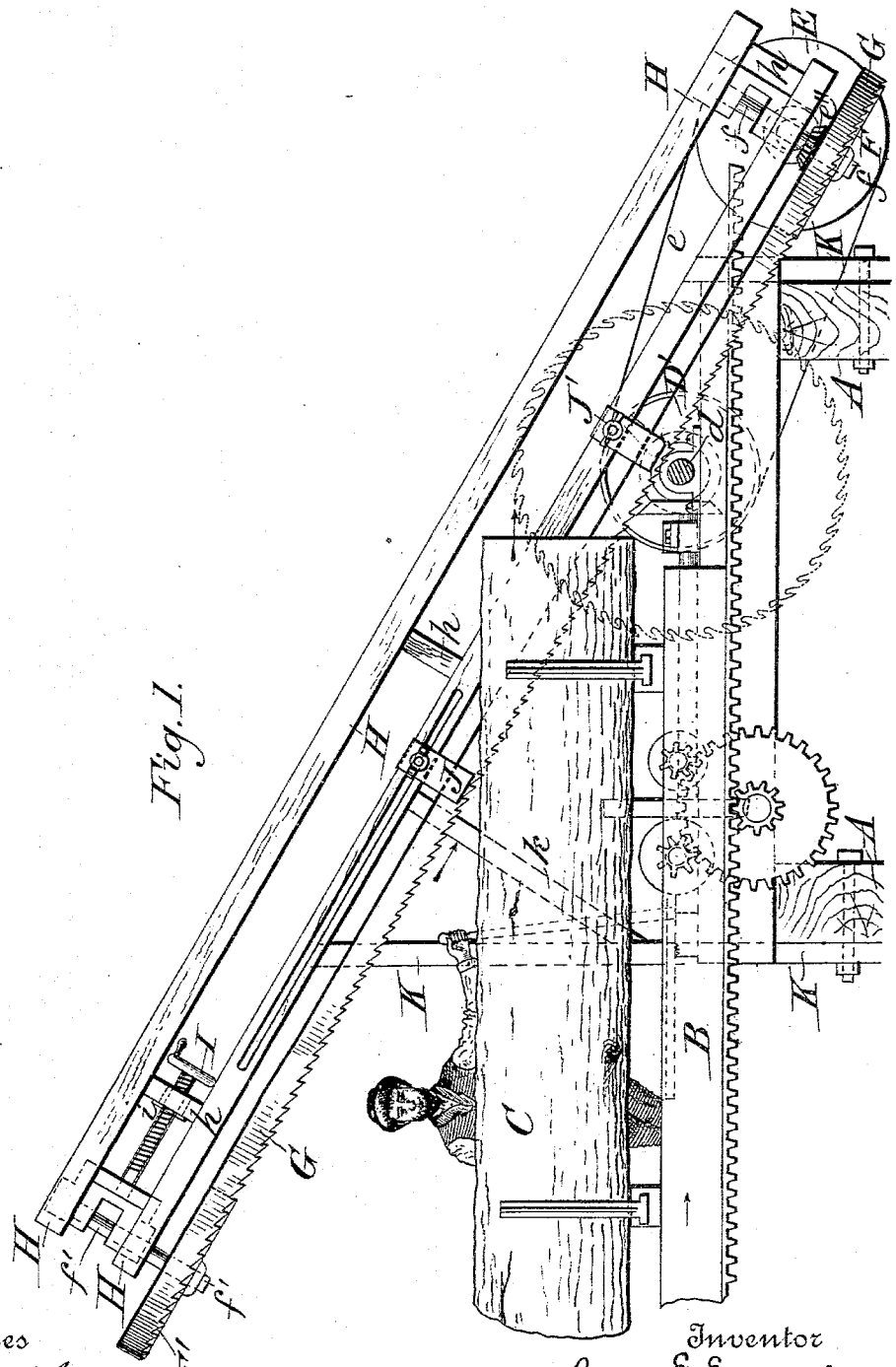
Figure 2:
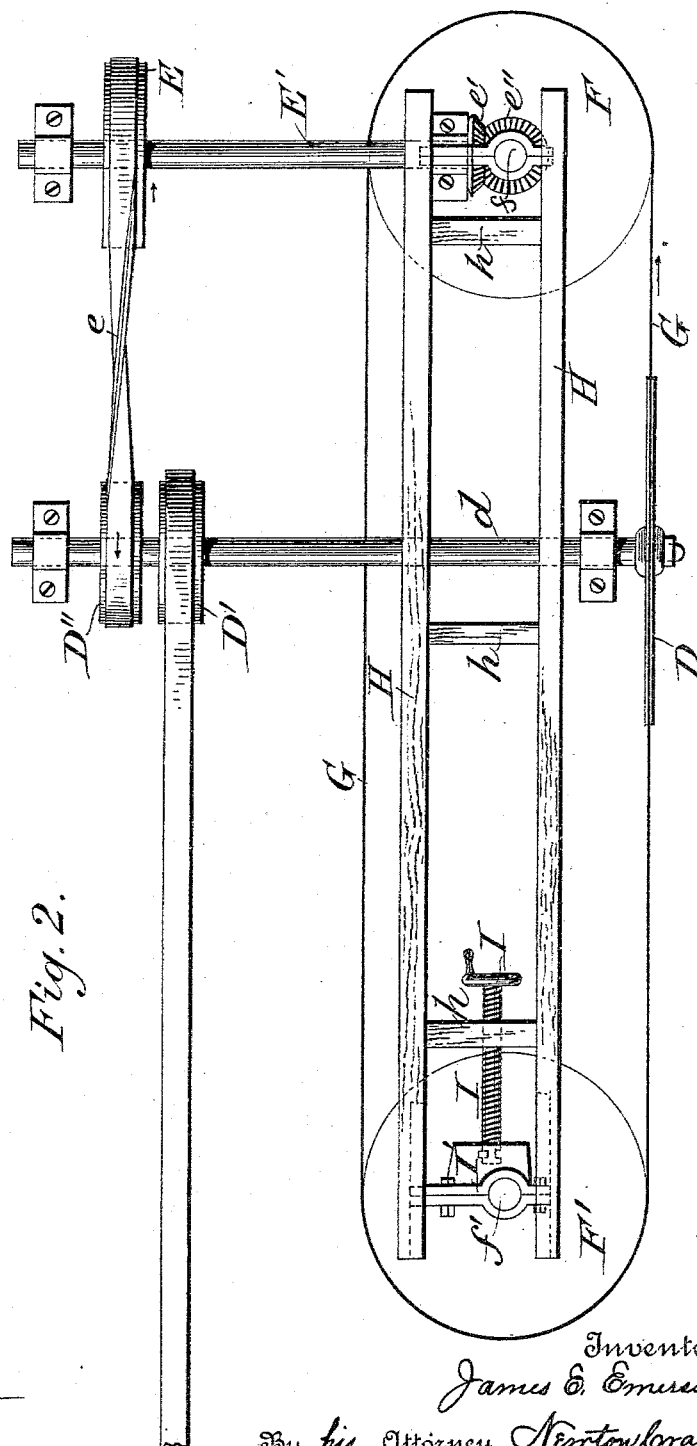

In the drawings, Figure 1 represents an upright side view of the band-saw, its supporting-frame, driving-pulleys, and the usual circular-saw-mill carriage with a log thereon, and the relative position of both the band-saw and circular saw as either would be in cutting its pathway through the log; also the mill-sills that support the log-carriage and the frame of the band-saw devices. Fig. 2 represents a plan view of Fig. 1, also showing that when the circular saw is removed from its arbor and the band-saw frame and its band-saw in its place the band-saw will cut on the same line through the log that the circular saw would cut if in use.

Heretofore most of the lumber has been sawed by circular saws that vary in diameter from about forty-two to seventy-two inches, and such saws must from necessity be thick enough to resist the tendency to cripple in the kerf in sawing with the feed that is given; hence it is a necessity, as timber becomes scarce, to save much that now goes into sawdust in sawing with the thick saws, which is now done by the use of a band-saw that is but about one-third the thickness of and the relative reduction of width of cut of the circular saw, and the cut of the band-saw coming in contact with the log or timber in an oblique or angular direction to the grain of the wood in the log, so that each tooth of the band-saw will cut its pathway with a shear or angular cut, which is the best and easiest mode, separating the wood into plank or boards parallel with the direction of the grain of the wood. This position of the band-saw with relation to the manner in which it cuts in the wood is shown in Fig. 1 of the drawings, and in the same figure is contrasted the position in which a circular saw cuts its pathway into a log of wood, which is at an angle against the grain of the wood, requiring much greater power to propel the saw in its work, and consequently greater liability for the saw to run or saw crooked.

Another advantage in placing the band-saw to cut its kerf at or about the angle shown in the log in Fig. 1 is, that in changing a portable circular-saw mill into a band-saw mill, and particularly a portable mill, which is generally located or planted upon moist level ground, the size of the pulleys over which the band-saw goes would necessitate a deep pit for the lower and driving pulley and its driving mechanism to work in and be kept dry or from the accumulation of sawdust; but when placed at the proper angle the driving band-pulley need not be located below the bed-timbers of the mill, as shown in Fig. 1.

The backwardly-inclined angle which the cut of the band-saw has with relation to the horizontal line is shown at about thirty degrees; but the angle may be varied, as circumstances may require, up to forty or forty-five degrees. Another advantage in placing the cut of the band-saw upon such angle is, that the saw begins its cut upon a point of wood at the top of the log, and as the log is fed forward the cut of the saw is lengthened in the log until the whole depth of the log is cut, and then the saw has gained its maximum of labor without any undue strain or tendency to turn the saw from cutting a straight kerf perpendicularly, as there always is when the saw-cut is at a right angle to the log and striking the whole diameter of the log at the same time, and at full speed and feed it is apt to dodge from a straight line of cut. Consequently the lumber cut is not true in thickness or straight in the direction of its cut, and hence the saw will bind more or less in the kerf and use more power in running the saw.

In the drawings, A A represent the supporting-sills of an ordinary portable circular-saw mill, with the necessary intermediate supports and mechanism to drive the ordinary log-carriage, B, with the log C thereon.

D represents a circular saw on its arbor $d$, which arbor or shaft has a driving-pulley, D', and pulley D'' thereon, and from pulley D'' motion is imparted through the belt $e$, to pulley E on shaft E', having bevel gear-wheel $e'$ thereon, gearing into bevel gear-wheel $e''$ on shaft $f$, that carries the driving-pulley F of the band-saw.

H H is a rectangular frame with proper binding-girts, $h$, to secure the frame together, and in which are journaled the shafts $f$ and $f'$, that carry the pulleys F and F', over which the band-saw G is placed, and to which the gear-wheel $e''$, through shaft $f$, gives motion. This frame, with its saw-carrying pulleys, when in position for operation, gives the saw a backwardly-inclined position over the log to be sawed, or inclined in the direction opposite to that in which the log and carriage move.

In frame H is secured at its upper end the adjusting device to keep the saw G in proper tension on pulleys F and F', consisting of the temper-screw I, that passes through one of the girts $h$ and nut $i$ to sliding block I', that freely slides in grooves or other proper device in or on the frame H.

J and J' are the usual guides to saw G, above and below the log, to keep the saw straight in its cut in the log or timber. Guide J is adjustable on frame H, to be adjusted to the diameter of the log or timber upon its top side.

K and K' are upright posts or supports secured at their bottom ends to the sills A A, or to any other proper and firm support. These posts may vary in length or height, to accommodate the necessary angle or position of the frame H and the cutting-teeth of the saw G. There may be as many of these posts as are necessary to support and hold the frame H in a fixed position, and be so braced by the braces $k$ as that there will be no swaying of the frame in any direction.

I am aware of Patent No. 169,035, in which the band-saw frame presents its saw to cut at an angle "against the grain" of the wood, while in my invention the cut of the saw is in the reverse direction, or to cut the fiber of the wood with a shear cut with the grain, and cutting the fiber against the grain is disclaimed.

Having thus fully described my invention, what I claim, and desire to secure by Letters Patent, is—

In a band-saw mill for sawing logs into lumber, the combination of the inclined frame H, pulleys F and F', carrying the band-saw G thereon at an angle of from thirty to forty-five degrees from the horizontal line in which the log C and carriage B move, gear-wheels $e''$ and $e'$ on shafts $f$ and E', respectively, pulley E, and belt $e$, with the common devices in use in operating circular-saw mills, substantially as shown and described.

In testimony whereof I affix my signature in presence of two witnesses.

JAMES E. EMERSON.

Witnesses:
NEWTON CRAWFORD,
W. H. RUFF.